Oct. 28, 1952     D. W. KELBEL     2,615,351
TRANSMISSION
Filed April 26, 1945     2 SHEETS—SHEET 1
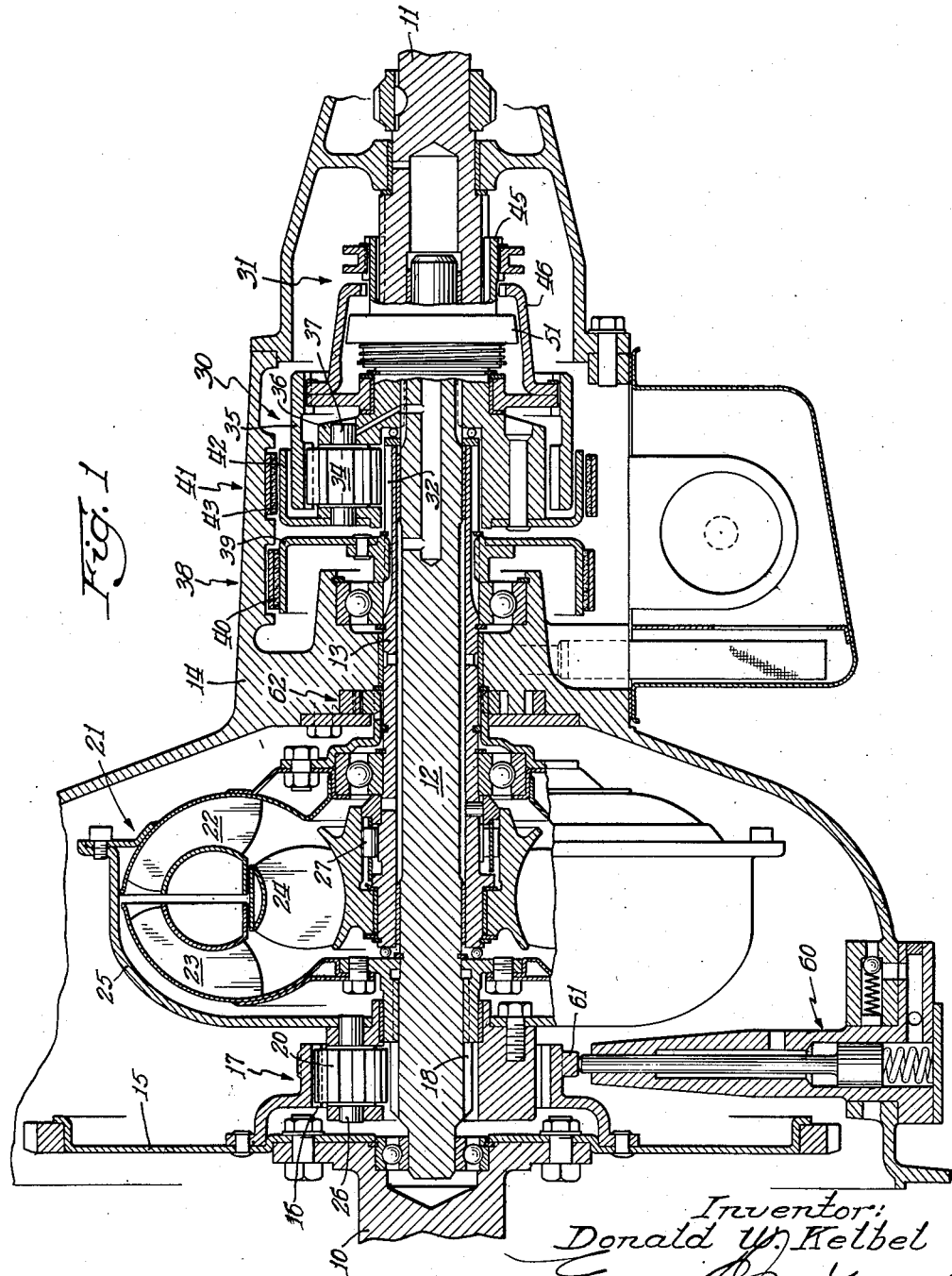
Inventor:
Donald W. Kelbel
By Edward C. Dritzbaugh
Atty.

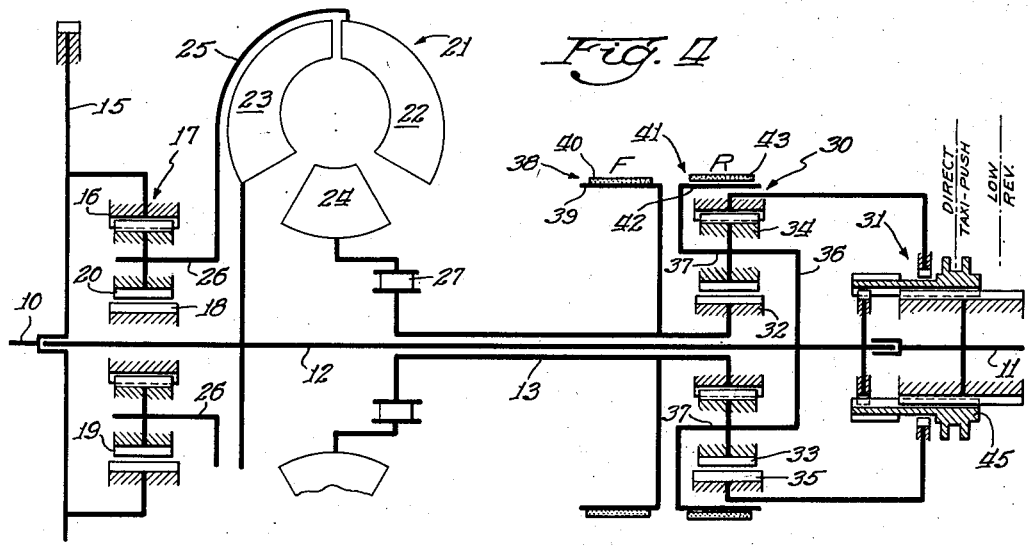

Patented Oct. 28, 1952

2,615,351

UNITED STATES PATENT OFFICE 2,615,351

TRANSMISSION

Donald W. Kelbel, Muncie, Ind., assignor to Borg-Warner Corporation, Chicago, Ill., a corporation of Illinois Application April 26, 1945, Serial No. 590,332

8 Claims. (Cl. 74—732)

My invention relates to transmissions and more particularly to transmissions which are suitable for use in automotive vehicles.

It is an object of my invention to provide an improved transmission comprising a hydrodynamic coupling device and more particularly a transmission including gearing driven by the hydraulic device and which provides two speeds in forward drive and a speed in reverse drive with the power trains for all drives including the hydraulic coupling device.

Still more particularly it is an object of the invention to provide in such a transmission a two position positive type coupling which in one position connects the gearing with the driven shaft of the transmission whereby the shaft is driven at a reduced speed ratio and in the other position directly connects the hydraulic coupling device and the driven shaft. It is also an object to provide synchronizing blocker means for the positive type coupling for synchronizing the speed of the parts to be coupled thereby and for blocking an engagement of the positive coupling prior to such synchronizing.

The invention consists of the novel constructions, arrangements and devices to be hereinafter described and claimed for carrying out the above stated objects and such other objects as will appear from the following description of a certain preferred embodiment, illustrated in the accompanying drawings, wherein:

Fig. 1 is a longitudinal sectional view of a transmission embodying the principles of the invention;

Fig. 2 is a longitudinal sectional view of positive clutch mechanism in the transmission shown in Fig. 1;

Fig. 3 is a sectional view similar to Fig. 2 but with the parts shown in different relative positions; and Fig. 4 is a diagrammatic illustration of the transmission shown in Figs. 1, 2 and 3.

Like characters of reference designate like parts in the several views.

Referring now to the drawings, the illustrated transmission may be seen to comprise a driving shaft 10, a driven shaft 11 and intermediate shafts 12 and 13. The shaft 10 is supported by any suitable means (not shown) such as a driving motor, and the shaft 11 is journaled in the transmission housing 14. The intermediate shaft 12 is piloted in both the shafts 10 and 11, and the intermediate shaft 13 is rotatably mounted with respect to both the shaft 12 and the housing 14.

A flywheel 15 is connected with the shaft 10, and a ring gear 16 of a planetary gear set 17 is connected with the flywheel and shaft. The planetary gear set 17 comprises a sun gear 18 formed on the shaft 12 and planet gears 19 and 20 which are in mesh with each other and one of which is in mesh with the ring gear 16 and the other of which is in mesh with the sun gear 18.

A hydrodynamic torque converter 21 is connected to be driven by the planetary gear set 17. The torque converter comprises an impeller 22, a runner 23 and a stator 24. The impeller 22 forms a portion of the housing of the converter and is connected with a housing portion 25 which forms the remainder of the housing for the converter. The housing portion 25 carries shafts 26, and the planetary gears 19 and 20 are rotatably disposed on the shafts 26 so that the shafts and housing portion constitute a planet gear carrier. The runner 23 of the torque converter is splined on the intermediate shaft 12 so as to drive this shaft. The stator 24 is rotatably disposed on the intermediate shaft 13, and a one-way roller brake device 27 is disposed between the stator and the intermediate shaft for preventing a reverse rotation of the stator when the shaft 13 is held from rotation. The converter 21 has liquid within its housing, and in accordance with the well-known principles of operation of such a device, when the impeller is driven, the runner is driven by means of the fluid to which energy is imparted by the impeller and at a greater torque than is given to the impeller. The stator is held stationary in such case until a certain speed of the runner is attained whereupon the freewheeling brake 27 releases, and the stator thereafter rotates in the forward direction along with the impeller and runner.

A planetary gear set 30 is connected with the intermediate shaft 12 to be driven thereby and is connectible with the driven shaft 11 by means of a jaw clutch mechanism 31 for driving the driven shaft. The planetary gear set 30 comprises a sun gear 32 formed on the intermediate shaft 13, planet gears 33 and 34, and a ring gear 35. The planet gear 33 is in mesh with the sun gear 32 and also with the planet gear 34, and the planet gear 34 is also in mesh with the ring gear 35. The planet gears are carried by a planet gear carrier 36 having shafts 37 disposed therein on which the planet gears are rotatably mounted. The planet gear carrier 36 is splined on the intermediate shaft 12, and the ring gear 35 is journaled on the carrier, as shown. A brake 38 is provided for the intermediate shaft 13, and the brake comprises a brake drum 39 and a brake band 40 for acting on the drum. A brake 41 is provided for the planet gear carrier 36, and this brake comprises a brake drum 42 and a brake band 43 acting on the drum.

The clutch mechanism 31 comprises a sleeve 45 splined on the driven shaft 11. A hollow member 46 is fixed to and carried by the ring gear 35 and on its inner edge is provided with clutch teeth 47. The sleeve 45 is provided with clutch teeth 48 on its outer surface which are adapted to mesh with the teeth 47 whereby the clutch mechanism 31 drivingly connects together the ring gear 35 and the driven shaft 11 (see Fig. 3). The clutch sleeve 45 is provided on its inner surface with clutch teeth 49 which are really continuations of the internal splines in the sleeve. The teeth 49 are adapted to mesh with clutch teeth 50 which are provided on the planet gear carrier 36 (see Fig. 2). The clutch mechanism in this position of the sleeve 45 functions to connect directly together the intermediate shaft 12 on which the planet gear carrier 36 is splined and the driven shaft 11.

A synchronizer ring 51 is provided for synchronizing the member 46 and the sleeve 45 before engagement of the teeth 47 and 48 can take place and a synchronizer ring 52 is provided for synchronizing the sleeve 45 and the planet gear carrier 36 before engagement of the teeth 49 and 50 can take place. The synchronizer ring 51 is splined on the teeth 48 and is acted on by a spring 53 which forces the ring a against shoulders 54 on the teeth when the sleeve 45 is in its position as shown in Fig. 2 with the teeth 48 being out of mesh with the teeth 47. The synchronizer ring 51 is adapted to frictionally contact the inner surface of the hollow member 46 under the influence of the spring 53 when the sleeve 45 is moved to the right as seen in Fig. 2 so as to synchronize the speed of the member 46 and sleeve 45 prior to engagement of the teeth 48 and 47. Shoulders 55 are provided on the teeth 48, and these shoulders coact with the splined inner portion of the synchronizer 51 to prevent the synchronizer from moving toward the left end of the sleeve 45 as the sleeve is moved toward the right. These shoulders thus prevent engagement of the teeth 48 with the teeth 47 until the speed of the member 46 and the sleeve 45 are substantially equalized, due to the synchronizer ring frictionally contacting the member 46, whereupon the synchronizer ring 51 moves past the shoulders 55 to allow the sleeve 45 to complete its movement toward the right as seen in the figure to interengage the teeth 48 with the teeth 47.

A leaf spring 56 is provided between the synchronizer ring 52 and the shaft 11 which tends to move the synchronizer ring toward the left as seen in the figures. The synchronizer ring 52 contacts a tapering surface 57 provided on the planet gear carrier 36, and the synchronizer ring thus has the function of tending to synchronize the speed of the planet gear carrier 36 and the shaft 11. The teeth 49 on the inner surface of the sleeve 45 are provided with shoulders 58 which contact the splined inner surfaces of the synchronizer ring 52 as the sleeve 45 is moved toward the left from its position as shown in Fig. 3 toward its position as shown in Fig. 2. These shoulders have the effect of forcing the synchronizer ring 52 against the surface 57 of the planet gear carrier to increase the force synchronizing the carrier 36 and shaft 11, and the shoulders have the additional function of preventing a full movement of the sleeve 45 toward the left from its Fig. 3 position to prevent an engagement of the teeth 49 with the teeth 50 until the speed of the shafts 12 and 11 has been substantially synchronized.

It is contemplated that the transmission shall preferably be controlled by fluid pressure operated means. A pump 60 driven by means of a cam 61 formed on the ring gear 16 and another pump 62 driven by the impeller 22 are provided which may form parts of the fluid system. In particular the pump 60 is adapted to keep that portion of the housing 14 surrounding the converter 21 dry while the pump 62 is adapted to supply a fluid pressure for applying the brakes 38 and 41.

For forward drive through the transmission, the brake 38 is engaged. It is assumed that the sleeve 45 is in its Fig. 3 position, for a low ratio drive. Such engagement of the brake 38 holds the intermediate shaft 13 stationary so that the one-way brake 27 is operative to prevent a reverse rotation of the stator 24 while allowing a forward rotation thereof. The brake 38 when thus engaged is also effective to brake the sun gear 32 of the planet gearing 41. The drive is then from the shaft 10 through the planet gearing 17, the impeller 22 of the torque converter 21, the runner 23 of the torque converter, the shaft 12, the planet gear carrier 36, the planet gears of the planet gearing 41, the ring gear 35, the hollow member 46 and the sleeve 45 to the driven shaft 11. The intermediate shaft 12 is initially stationary, and the rotation of the ring gear 16 due to the action of the planet gear set 17 causes the impeller 22 to rotate in the forward direction at a faster speed than that of the drive shaft 10. A substantial torque is thus exerted on the runner 23 and the shaft 12 to start the shaft moving. As the shaft 12 gains in speed, the speed of the impeller 22 decreases in relation to the speed of the drive shaft 10, and an increasing portion of the power flows through the planet gears 19 and 20 and the sun gear 18 directly to the intermediate shaft 12.

The intermediate shaft 12 drives the planet gear carrier 36, and with the sun gear 32 held stationary by the brake 38, the ring gear 35 and thereby the hollow member 46 and the driven shaft 11 are driven at a predetermined low speed ratio with respect to the shaft 12. Thus in low speed forward drive with the clutch sleeve 45 in its Fig. 3 position, the shaft 11 is driven at a torque which is initially the sum of the torque ratios through the converter 21 and the planet gear set 30 and which decreases to the torque ratio of the planet gear set 30 itself as the speed of the shaft 11 increases and the torue converter 21 commences to function as an ordinary fluid coupling with the stator 24 rotating in the forward direction.

In order to shift to high speed ratio, the driving torque impressed on the shaft 10 is interrupted and the clutch sleeve 45 is moved from its Fig. 3 to its Fig. 2 position to directly connect the shafts 12 and 11. When the shafts 12 and 11 are synchronized in speed, the sleeve 45 may complete its shift, as has been hereinbefore explained. The drive is then from the drive shaft 10 through the planet gear set 17 directly to the shaft 12, and also indirectly to the shaft 12 through the torque converter 21, and through the clutch teeth 49 and 50 to the shaft 11. The speed ratio between the shafts 10 and 11 under these conditions approaches a 1:1 ratio, inasmuch as the planet gear set 30 is not utilized and inasmuch as the parts of the planet gear set 17 are rotating substantially at the same speed with respect to each other since the impeller 22 and the runner 23 are rotating at substantially the same speed. In order to start an engine (not shown) connected with the shaft 10 by pushing the vehicle and thereby driving the shaft 11, the clutch sleeve 45 is put in its Fig. 2 or "taxi push" position, and the drive is the same as above described with the exception that it proceeds from the shaft 11 to the shaft 10 rather than vice versa.

For reverse, the brake 41 is engaged, the brake 38 is disengaged, and the sleeve 45 is in its Fig. 3 position to connect the ring gear 35 and the shaft 11. The brake 41 holds the carrier 36, the shaft 12 and the runner 23 stationary, and upon rotation of the impeller 22 from the drive shaft 10 through the gear set 17, the stator 24 is driven in the reverse direction. The stator drives the shaft 13 through the roller unit 27, the sun gear 32, the ring gear 35 through the planet gear unit 30, the hollow member 46, the sleeve 45 and the shaft 11 all in the reverse direction.

My improved transmission advantageously provides a low speed ratio through the rear planet gear set 30 and a high speed ratio with the shafts 12 and 11 being directly connected. The positive clutch mechanism advantageously allows a quick and efficient connection of the driven shaft 11 either with the ring gear 35 or with the intermediate shaft 12.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a transmission, the combination of a drive shaft, a driven shaft, a hydraulic torque converter driven by said drive shaft and having a driven element, planetary gearing comprising a ring gear, planet gears, and a planet gear carrier, said planet gear carrier being connected with said driven element of said converter, means for braking an element of said planetary gearing whereby the ring gear is driven at a reduced speed with respect to said driven element of the converter, positive type clutch means for directly connecting said driven element and said driven shaft in one position of the clutch means and for connecting said ring gear and said driven shaft in another position of the clutch means, and means effective for each position of said positive clutch means for synchronizing the parts to be coupled by the clutch means and for blocking the engagement of the clutch means prior to such synchronization.

2. In a transmission, the combination of a drive shaft, a driven shaft, an intermediate shaft, a hydrodynamic coupling device driven by said drive shaft and having a driven element, said driven element being connected with said intermediate shaft, speed reduction planetary gearing connected to be driven by said intermediate shaft, positive type clutch means in one position directly connecting said intermediate shaft and said driven shaft and in another position connecting said gearing with said driven shaft whereby the driven shaft is driven at a reduced speed ratio with respect to the intermediate shaft, said clutch means including teeth carried by said intermediate shaft, a hollow element driven by said gearing at a reduced speed ratio and having teeth on an edge thereof, and a sleeve splined on to said driven shaft and having teeth adapted to interengage with either of said first named teeth depending on the position of the sleeve, and synchronizing rings for synchronizing the intermediate and driven shafts before the shafts are coupled together by the sleeve and for synchronizing the hollow element and the driven shaft before the element and shaft are connected together by the sleeve, one of said synchronizing rings frictionally acting between the intermediate and driven shafts and the other synchronizing ring being disposed on said sleeve and frictionally acting on the internal surface of said hollow element.

3. In a transmission, the combination of a drive shaft, a driven shaft, a hydraulic torque converter driven by said drive shaft and having a driven element, an intermediate shaft connected with said driven element, planetary speed reduction gearing comprising a ring gear, planet gears, and a planet gear carrier, said gear carrier being connected with said intermediate shaft to be driven thereby, positive type clutch means for directly connecting said intermediate shaft and said driven shaft in one position thereof and for connecting said ring gear and said driven shaft in another position thereof for driving the driven shaft at a reduced speed ratio with respect to the intermediate shaft, said positive type clutch means including a hollow element driven by said ring gear and having clutch teeth on an edge thereof, clutch teeth carried by said intermediate shaft, and a sleeve splined on to said driven shaft and adapted to interengage with either set of teeth depending on the position of the sleeve, and synchronizing rings for synchronizing the speed of the parts to be connected by the sleeve prior to the engagement of the respective sets of teeth and for blocking such engagement prior to such synchronization, one of said synchronizing rings being disposed between the intermediate and driven shafts and the other synchronizing ring being disposed on said sleeve and frictionally acting on the internal surface of said hollow element.

4. In positive clutch mechanism, the combination of a first shaft, a second shaft, and a rotatable element, said element and said second shaft being coaxial with respect to said first shaft and disposed at one end thereof and said element being disposed over said second shaft, and positive clutch means for coupling said first shaft to either said second shaft or said rotatable element and including a hollow member coaxial with respect to said shafts and connected with said element, said hollow member having internal clutch teeth on an edge thereof, clutch teeth on said second shaft, and a sleeve splined on said first shaft and having teeth on its outer surface adapted to interengage with the teeth on said hollow member in one position of the sleeve and having teeth on its inner surface adapted to interengage with the teeth on said second shaft in another position of the sleeve.

5. In positive clutch mechanism, the combination of a first shaft, a second shaft, and a rotatable gear, said second shaft gear being coaxial with respect to said first shaft, positive clutch means for coupling said first shaft to either said second shaft or said gear and including a hollow member coaxial with respect to said shafts and connected with said gear, said hollow member having internal clutch teeth on an edge thereof, clutch teeth on said second shaft, and a sleeve splined on said first shaft and having teeth on its outer surface adapted to interengage with the teeth on said hollow member in one position of the sleeve and having teeth on its inner surface adapted to interengage with the teeth on said second shaft in another position of the sleeve, and synchronizing means for synchronizing the parts to be coupled by said positive clutch means prior to engagement of the sleeve with either of said sets of teeth and including a friction synchronizer ring disposed between said shafts and a friction synchronizer ring disposed on said sleeve and frictionally acting on the inner surface of said hollow member.

6. In positive clutch mechanism, the combination of a first shaft, a second shaft, and a gear, said second shaft and gear being coaxially disposed with respect to said first shaft, positive clutch means for coupling said first shaft to either said second shaft or said gear and including a hollow member coaxial with respect to said shaft and connected with said gear, said hollow member having clutch teeth on an edge thereof, clutch teeth on said second shaft, and a sleeve splined on said first shaft and having teeth on its outer surface adapted to interenegage with the teeth on said hollow member and having teeth on its innner surface adapted to interengage with the teeth on said second shaft, a synchronizer ring disposed between said shafts and splined on the teeth on the inner surface of said sleeve for synchronizing the speed of said shafts prior to a coupling together thereof by said sleeve, a friction synchronizer ring splined on the teeth on the outer surface of said sleeve and being adapted to frictionally engage the inner surface of said hollow member for synchronizing the speed of the hollow member and the driven shaft prior to a coupling together thereof by the sleeve, and means for blocking movement of the sleeve into either of its coupling positions prior to synchronization of the parts to be coupled thereby and including shoulders formed on the teeth of said sleeve and cooperating with the synchronizer rings splined on the teeth preventing an axial movement of the sleeve toward either engaged position while there is a substantial torque exerted on the corresponding synchronizer ring.

7. In positive clutch mechanism, the combination of a first shaft and a second shaft and a rotatable element, said element and said second shaft being coaxial with respect to said first shaft and disposed at one end thereof and said element being disposed over said second shaft, and positive clutch means for coupling said first shaft to either said second shaft or said rotatable element and including a hollow member coaxial with respect to said shafts and connected with said element, said hollow member having clutch teeth on an edge thereof, clutch teeth on said second shaft, the clutch teeth on said second shaft being relatively adjacent said element and said hollow member extending over said last named clutch teeth and having its clutch teeth relatively remote from said element, and a sleeve splined on said first shaft and having teeth on its outer surface adapted to interengage with the teeth on said hollow member when the sleeve is moved away from said element and having teeth on its inner surface adapted to interengage with the teeth on said second shaft when said sleeve is moved toward said element.

8. In positive clutch mechanism, the combination of a first shaft and a second shaft and a rotatable element, said element and said second shaft being coaxial with respect to said first shaft and disposed at one end thereof and said element being disposed over said second shaft, and positive clutch means for coupling said first shaft to either said second shaft or said rotatable element, said clutch means including a set of teeth on said second shaft and a set of internal teeth carried by said rotatable element and axially spaced from said first named clutch teeth, and a sleeve splined on said first shaft and having teeth on its outer surface adapted to interengage with one of said sets of teeth in one axial position of the sleeve and having teeth on its inner surface adapted to engage with the other of said sets of teeth in another axial position of the sleeve.

DONALD W. KELBEL.

REFERENCES CITED

The following references are of record in the file of this patent:

UNITED STATES PATENTS

| Number | Name | Date |
|---|---|---|
| 1,207,767 | Kennedy | Dec. 12, 1916 |
| 1,863,128 | Salerni | June 14, 1932 |
| 1,931,762 | Griswold | Oct. 17, 1933 |
| 2,144,674 | Campbell | Jan. 24, 1939 |
| 2,146,369 | Dodge | Feb. 7, 1939 |
| 2,187,967 | Fawick | Jan. 23, 1940 |
| 2,202,271 | Sinclair | May 28, 1940 |
| 2,224,884 | Schneider | Dec. 17, 1940 |
| 2,242,515 | Dodge | May 20, 1941 |
| 2,256,960 | Neracher | Sept. 23, 1941 |
| 2,316,390 | Biermann | Apr. 13, 1943 |
| 2,328,291 | Osborne | Aug. 31, 1943 |
| 2,333,680 | Schneider | Nov. 9, 1943 |
| 2,351,213 | James | June 13, 1944 |
| 2,360,646 | Carnagua | Oct. 17, 1944 |
| 2,392,762 | Peterson | Jan. 8, 1946 |
| 2,399,569 | Peterson | Apr. 30, 1946 |
| 2,433,003 | Swennes | Dec. 23, 1947 |